(12) United States Patent
Bjelland et al.

(10) Patent No.: US 7,512,104 B2
(45) Date of Patent: Mar. 31, 2009

(54) RESOLVING HANGING CONTEXTS WHEN ROAMING IN A GPRS NETWORK

(75) Inventors: Frode Bjelland, Arendal (NO); Ezzat Kaafarani, Grimstad (NO)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 1120 days.

(21) Appl. No.: 10/364,189

(22) Filed: Feb. 11, 2003

(65) Prior Publication Data
US 2003/0153309 A1 Aug. 14, 2003

(30) Foreign Application Priority Data
Feb. 11, 2002 (NO) .................................. 20020667

(51) Int. Cl.
*H04Q 7/24* (2006.01)
(52) U.S. Cl. ..................... 370/338; 370/331; 370/351; 370/401; 370/352; 455/432.1; 455/435; 455/436; 455/458
(58) Field of Classification Search .................. 370/338, 370/401, 331, 351, 352, 328; 455/436, 432.1
See application file for complete search history.

(56) References Cited

U.S. PATENT DOCUMENTS

| 6,104,929 | A * | 8/2000 | Josse et al. ................ 455/445 |
| 6,233,458 | B1 * | 5/2001 | Haumont et al. ............ 455/445 |
| 6,512,756 | B1 * | 1/2003 | Mustajarvi et al. .......... 370/341 |
| 6,661,782 | B1 * | 12/2003 | Mustajarvi et al. .......... 370/331 |
| 6,714,784 | B1 * | 3/2004 | Forssell et al. ............. 455/436 |
| 6,751,748 | B1 * | 6/2004 | Bush ............................. 714/4 |
| 6,807,419 | B1 * | 10/2004 | Laiho et al. ................ 455/436 |
| 6,845,095 | B2 * | 1/2005 | Krishnarajah et al. ....... 370/349 |
| 6,862,450 | B2 * | 3/2005 | Mikola et al. .............. 455/438 |
| 6,870,820 | B1 * | 3/2005 | Forssell et al. ............. 370/328 |
| 6,909,895 | B2 * | 6/2005 | Einola et al. ............... 455/423 |
| 6,928,284 | B2 * | 8/2005 | Palat et al. ................. 455/436 |
| 6,930,980 | B2 * | 8/2005 | Tourunen et al. ........... 370/236 |
| 6,955,918 | B2 * | 10/2005 | Haumont et al. ........... 455/436 |
| 6,968,190 | B1 * | 11/2005 | Suumaki et al. ............ 455/436 |
| 6,973,054 | B2 * | 12/2005 | Bjelland et al. ............ 370/310 |
| 7,009,951 | B2 * | 3/2006 | Kalliokulju et al. ........ 370/331 |
| 7,016,679 | B2 * | 3/2006 | Palat et al. ................. 455/436 |
| 7,054,945 | B2 * | 5/2006 | Hurtta et al. ............... 709/230 |

(Continued)

*Primary Examiner*—Marceau Milord
(74) *Attorney, Agent, or Firm*—Thomas Bethea, Jr.

(57) ABSTRACT

The present invention discloses a method for preventing hanging resources in connection with an SRNS Relocation Procedure and/or a Routing Area Update Procedure for a terminal roaming in a UMTS or a GPRS network. According to a first aspect of the present invention, when the SGSN from which a terminal is roaming detects a fault after the Relocation Command in the SRNS Relocation Procedure, a Relocation Cancel Procedure also involving any involved GGSN is initiated. According to a second aspect of the present invention, a timer is started in the SGSN to which the terminal is roaming when the Forward Relocation Request in the Routing Area Update Procedure is received. If this SGSN does not receive a Routing Area Update Request within a predefined time period, the SGSN initiate a clean up of the resources that have been occupied during the procedures towards the involved nodes. Finally, according to a third aspect of the present invention, after an uncontrolled shutdown of the terminal, the SGSN cleans up in the resulting hanging resources of the involved nodes when an Identification Request is received in the subsequent attach procedure.

12 Claims, 6 Drawing Sheets

U.S. PATENT DOCUMENTS

| | | | |
|---|---|---|---|
| 7,079,519 B2 * | 7/2006 | Lee et al. | 370/338 |
| 7,127,251 B2 * | 10/2006 | Laiho et al. | 455/436 |
| 7,167,475 B2 * | 1/2007 | Tourunen et al. | 370/394 |
| 7,290,063 B2 * | 10/2007 | Kalliokulju et al. | 709/247 |
| 7,359,347 B2 * | 4/2008 | Ahmavaara et al. | 370/328 |
| 2002/0064144 A1 * | 5/2002 | Einola et al. | 370/335 |
| 2002/0089949 A1 * | 7/2002 | Bjelland et al. | 370/331 |
| 2002/0150084 A1 * | 10/2002 | Lee et al. | 370/352 |
| 2003/0073437 A1 * | 4/2003 | Yuen | 455/432 |

* cited by examiner

RESOLVING HANGING CONTEXTS WHEN ROAMING IN A GPRS NETWORK

CROSS-REFERENCE TO RELATED APPLICATIONS

This application claims the benefit of the filing date as provided by 35 U.S.C. 119 of Norwegian patent application number 2002.0667, filed on Feb. 11, 2002, the disclosure of which is incorporated herein by reference.

BACKGROUND OF THE INVENTION

The present invention is related to roaming in General Packet Radio System (GPRS) and Universal Mobile Telecommunication System (UMTS) networks; in particular to a method for avoiding hanging resources in Serving GPRS Support Nodes (SGSN), Gateway GPRS Support Nodes (GGSN), and Radio Network Controllers (RNC).

BRIEF SUMMARY OF THE INVENTION

When a GPRS (General Packet Radio Service) Mobile Station (MS), being in Mobility Management (MM) state PMM-Connected (Packet Mobility Management-Connected), roams in a packet switched UMTS (Universal Mobile Telecommunication System) network, the 3GPP (3rd Generation Partnership Project) TS (Technical Specification) 23.060 specifies that an SRNS (Serving Radio Network Subsystem) Relocation procedure shall be followed by an RAU (Routing Area Update) procedure. During these procedures, some fault situations may occur.

Figure 1:
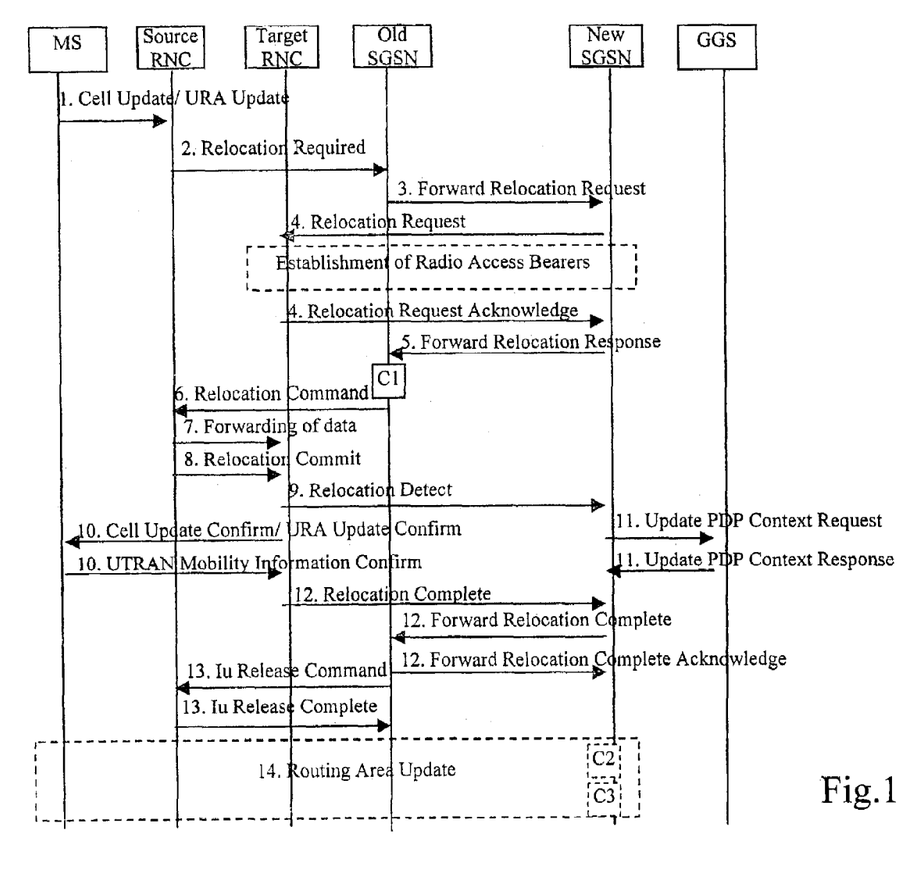
FIG. 1 illustrates the message float of an inter SGSN Routing Area Update Procedure and SRNS Relocation Procedure according to 3GPP TS 23.060.

In order to describe the problem better, the SRNS Relocation procedure as described in 3GPP TS 23.060 is shown in FIG. 1. Note that for simplicity only, one of the possible SRNS Relocation procedures is shown here. This invention will however be equally applicable for the other SRNS Relocation procedures.

1) The MS sends a Cell Update/URA Update message to the source SRNC (if the cell is located under another RNC, the message is routed via the DRNC to SRNC over the Iur). The source SRNC decides whether or not to perform a combined cell/URA update and SRNS relocation towards the target RNC. The rest of this sub-clause describes the case where a combined cell/URA update and SRNS relocation is applicable. In this case, no radio bearer is established between the source SRNC and the UE. Nonetheless the following tunnel(s) are established: GTP-U tunnel(s) between source SRNC and old-SGSN; GTP-U tunnel(s) between old-SGSN and GGSN.

2) The source SRNC sends a Relocation Required message (Relocation Type, Cause, Source ID, Target ID, Source RNC to Target RNC Transparent Container) to the old SGSN. The source SRNC shall set Relocation Type to "UE not involved". Source RNC to Target RNC Transparent Container includes the necessary information for Relocation co-ordination, security functionality, and RRC protocol context information (including MS Capabilities).

3) The old SGSN determines from the Target ID if the SRNS Relocation is intra-SGSN SRNS relocation or inter-SGSN SRNS relocation. In the case of inter-SGSN SRNS relocation, the old SGSN initiates the relocation resource allocation procedure by sending a Forward Relocation Request (IMSI, Tunnel Endpoint Identifier Signalling, MM Context, PDP Context, Target Identification, UTRAN Transparent Container, RANAP Cause) message to the new SGSN. PDP context contains GGSN Address for User Plane and Uplink TEID for Data (to this GGSN Address and Uplink TEID for Data, the old SGSN and the new SGSN send uplink packets). At the same time a timer is started on the MM and PDP contexts in the old SGSN, see Routing Area Update procedure in sub-clause "Location Management Procedures (UMTS only)." The Forward Relocation Request message is applicable only in case of inter-SGSN SRNS relocation.

4) The new SGSN sends a Relocation Request message (Permanent NAS UE Identity, Cause, CN Domain Indicator, Source RNC to Target RNC Transparent Container, RABs To Be Set-up) to the target RNC. For each requested RAB, RABs To Be Set-up shall contain information such as RAB ID, RAB parameters, Transport Layer Address, and Iu Transport Association. The RAB ID information element contains the NSAPI value, and the RAB parameters information element gives the QoS profile. The Transport Layer Address is the SGSN Address for user data, and the Iu Transport Association corresponds to the uplink Tunnel Endpoint Identifier Data.

After all necessary resources for accepted RABs including the Iu user plane are successfully allocated; the target RNC shall send the Relocation Request Acknowledge message (RABs setup, RABs failed to set-up) to the new SGSN. Each RAB to be set-up is defined by a Transport Layer Address, which is the target RNC Address for user data, and an Iu Transport Association that corresponds to the downlink Tunnel Endpoint Identifier for user data. The target-RNC may simultaneously receive for each RAB to be set up downlink user packets, both from the source SRNC and from the new SGSN.

After the new SGSN receives the Relocation Request Acknowledge message, the GTP-U tunnels are established between the target RNC and the new-SGSN.

5) When resources for the transmission of user data between the target RNC and the new SGSN have been allocated and the new SGSN is ready for relocation of SRNS, the Forward Relocation Response message (Cause, RANAP Cause, and Target RNC Information) is sent from the new SGSN to the old SGSN. This message indicates that the target RNC is ready to receive the forwarded downlink packets from the source SRNC, i.e., the relocation resource allocation procedure is terminated successfully. RANAP Cause is information from the target RNC to be forwarded to the source SRNC. The RAB Set-up Information, one information element for each RAB, contains the RNC Tunnel Endpoint Identifier and RNC IP address for data forwarding from the source SRNC to the target RNC. If the target RNC or the new SGSN failed to allocate resources, the RAB Set-up Information element contains only NSAPI indicating that the source SRNC shall release the resources associated with the NSAPI. The Forward Relocation Response message is applicable only in case of inter-SGSN SRNS relocation.

6) The old SGSN continues the relocation of SRNS by sending a Relocation Command (RABs to be released, and RABs subject to data forwarding) message to the source SRNC. The old SGSN decides the RABs subject to data forwarding based on QoS, and those RABs shall be contained in RABs subject to data forwarding. For each RAB subject to data forwarding, the information element shall contain RAB ID, Transport Layer Address, and Iu Transport Association. These are the same Transport Layer Address and Iu Transport Association that the target RNC had sent to new SGSN in Relocation Request Acknowledge message, and these are used for forwarding of downlink N-PDU from the source SRNC to the target RNC. The source SRNC is now ready to forward downlink data directly to the target RNC over the Iu interface. This forwarding is performed for downlink user data only.

7) The source SRNC may, according to the QoS profile, begin the forwarding of data for the RABs subject to data forwarding and starts the data-forwarding timer. The data forwarding at SRNS relocation shall be carried out through the Iu interface, meaning that the data exchanged between the source SRNC and the target RNC are duplicated in the source SRNC and routed at the IP layer towards the target RNC.

Note that the order of steps, starting from step 7 onwards, does not necessarily reflect the order of events. For instance, source RNC may send data forwarding (step 7) and starting Relocation Commit message (step 8) almost simultaneously. Target RNC may send Relocation Detect message (step 9) and Cell Update Confirm/URA Update Confirm message (step 10) at the same time. Hence, target RNC may receive the UTRAN Mobility Information Confirm message from MS (step 10) while data forwarding (step 8) is still underway, and before the new SGSN receives Update PDP Context Response message (step 11).

The data forwarding at SRNS relocation shall be carried out through the Iu interface, meaning that the GTP-PDUs exchanged between the source SRNC and the target RNC are duplicated in the source SRNC and routed at the IP layer towards the target RNC. For each radio bearer using loss-less PDCP, the GTP-PDUs related to transmitted, but not yet acknowledged, PDCP-PDUs are duplicated and routed at IP layer towards the target RNC together with their related downlink PDCP sequence numbers. The source RNC continues transmitting duplicates of downlink data and receiving uplink data.

Before the serving RNC role is taken over by target RNC and when downlink user plane data starts to arrive to target RNC, the target RNC may buffer or discard arriving downlink GTP-PDUs according to the related QoS profile.

8) Before sending the Relocation Commit, the uplink and downlink data transfer in the source; SRNC shall be suspended for RABs, which requires delivery order. When the source SRNC is ready, the source SRNC shall trigger the execution of relocation of SRNS by sending a Relocation Commit message (SRNS Contexts) to the target RNC over the Iur interface. The purpose of this procedure is to transfer SRNS contexts from the source RNC to the target RNC, and to move the SRNS role from the source RNC to the target RNC. SRNS contexts are sent for each concerned RAB and contain the sequence numbers of the GTP-PDUs next to be transmitted in the uplink and downlink directions and the next PDCP sequence numbers that would have been used to send and receive data from the MS. PDCP sequence numbers are only sent by the source RNC for radio bearers, which used loss-less PDCP [57]. The use of loss-less PDCP is selected by the RNC when the radio bearer is set up or reconfigured. For PDP context(s) using delivery order not required (QoS profile), the sequence numbers of the GTP-PDUs next to be transmitted are not used by the target RNC.

If delivery order is required (QoS profile), consecutive GTP-PDU sequence numbering shall be maintained throughout the lifetime of the PDP context(s). Therefore, during the entire SRNS relocation procedure for the PDP context(s) using delivery order required (QoS profile), the responsible GTP-U entities (RNCs and GGSN) shall assign consecutive GTP-PDU sequence numbers to user packets belonging to the same PDP context for uplink and downlink respectively.

9) The target RNC shall send a Relocation Detect message to the new SGSN when the relocation execution trigger is received. For SRNS relocation type "UE not involved", the relocation execution trigger is the reception of the Relocation Commit message from the Iur interface. When the Relocation Detect message is sent, the target RNC shall start SRNC operation.

10) The target SRNC sends a Cell Update Confirm/URA Update Confirm message. This message contains UE information elements and CN information elements. The UE information elements include among others new SRNC identity and S-RNTI. The CN information elements contain among others Location Area Identification and Routing Area Identification. The procedure shall be coordinated in all Iu signalling connections existing for the MS.

Upon reception of the Cell Update Confirm/URA Update Confirm message, the MS may start sending uplink user data to the target SRNC. When the MS has reconfigured itself, it sends the UTRAN Mobility Information Confirm message to the target SRNC. This indicates that the MS is also ready to receive downlink data from the target SRNC.

If the new SGSN has already received the Update PDP Context Response message from the GGSN, it shall forward the uplink user data to the GGSN over this new GTP-U tunnel. Otherwise, the new SGSN shall forward the uplink user data to that GGSN IP address and TEID(s), which the new SGSN had received earlier by the Forward Relocation Request message.

The target SRNC and the MS exchange the PDCP sequence numbers. PDCP-SNU and PDCP-SND. PDCP-SND is the PDCP sequence number for the next expected in-sequence downlink packet to be received in the MS per radio bearer, which used loss-less PDCP in the source RNC. PDCP-SND confirms all mobile terminated packets successfully transferred before the SRNC relocation procedure. If PDCP-SND confirms the reception of packets that were forwarded from the source SRNC, the target SRNC shall discard these packets. PDCP-SNU is the PDCP sequence number for the next expected in-sequence uplink packet to be received in the RNC per radio bearer, which used loss-less PDCP in the source RNC. PDCP-SNU confirms all mobile originated packets successfully transferred before the relocation. If PDCP-SNU confirms reception of packets that were received in the source SRNC, the target SRNC shall discard these packets.

11) Upon receipt of the Relocation Detect message, the CN may switch the user plane from the source RNC to the target SRNC. If the SRNS Relocation is an inter-SGSN SRNS relocation, the new SGSN sends Update PDP Context Request messages (new SGSN Address, SGSN Tunnel Endpoint Identifier, QoS Negotiated) to the GGSNs concerned. The GGSNs update their PDP context fields and return an Update PDP Context Response (GGSN Tunnel Endpoint Identifier) message.

12) When the target SRNC receives the UTRAN Mobility Information Confirm message, i.e. the new SRNC-ID+ S-RNTI are successfully exchanged with the MS by the radio protocols, the target SRNC shall initiate the Relocation Complete procedure by sending the Relocation Complete message to the new SGSN. The purpose of the Relocation Complete procedure is to indicate by the target SRNC the completion of the relocation of the SRNS to the CN. If the user plane has not been switched at Relocation Detect, the CN shall upon reception of Relocation Complete switch the user plane from the source RNC to the target SRNC. If the SRNS Relocation is an inter SGSN SRNS relocation, the new SGSN signals to the old SGSN the completion of the SRNS relocation procedure by sending a Forward Relocation Complete message.

13) Upon receiving the Relocation Complete message or if it is an inter-SGSN SRNS relocation, the old SGSN sends an Iu Release Command message to the source RNC. When the RNC data-forwarding timer has expired, the source RNC responds with an Iu Release Complete.

14) After the MS has finished the Cell/URA update and RNTI reallocation procedure and if the new Routing Area Identification is different from the old one, the MS initiates the Routing Area Update procedure. See subclause "Location Management Procedures (UMTS only)". Note that it is only a subset of the RA update procedure that is performed, since the MS is in PMM-CONNECTED state.

Figure 2:
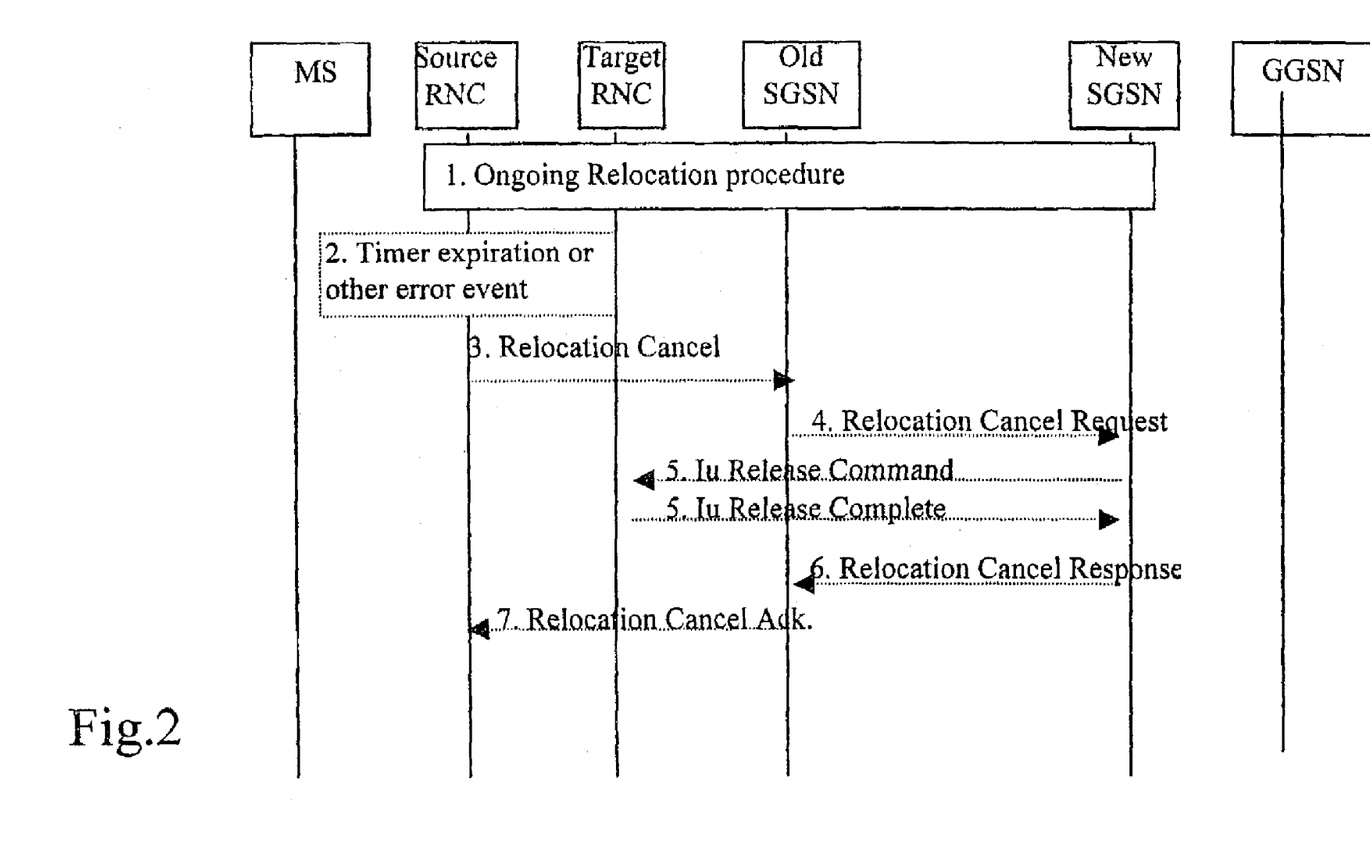
FIG. 2 illustrates the message float of an SRNS Cancel Relocation Procedure.

If a fault occurs before step 6 is reached in FIG. 1, a Relocation Cancel procedure is performed, and this will resolve inconsistencies in the network. The Relocation Cancel procedure, as described in 3GPP TS 23.060, is shown in FIG. 2.

1) An SRNS Relocation procedure has started, as described in FIG. 1.
2) The SRNS Cancel Relocation may be initiated by a timer expiry or by an error event in the source RNC.
3) When one of conditions in 2a is satisfied, the source RNC sends a Relocation Cancel (Cause) to the old SGSN. Cause indicates the reason for cancelling the ongoing SRNS relocation.
4) The old SGSN sends a Relocation Cancel Request (IMSI, RANAP Cause) to the new SGSN to indicate that the ongoing SRNS relocation should be cancelled. RANAP Cause contains the cause value received by the source RNC in the Relocation Cancel message.
5) The new SGSN sends an Iu Release Command (Cause) to request from the target RNC to release the Iu resources already allocated for the SRNS relocation, or to cancel the ongoing allocation of Iu resources for the SRNS relocation. Cause is set equal to RANAP Cause, i.e. to whatever cause value was included in the Relocation Cancel Request received from old SGSN. The target RNC releases the requested Iu resources and responds with an Iu Release Complete.
6) The new SGSN acknowledges the cancellation of the ongoing SRNS Relocation by sending a Relocation Cancel Response to the old SGSN.
7) The old SGSN responds to the source RNC with a Relocation Cancel Ack message.

However, there are three possible fault situations that are not described in the current 3GPP TSs, and hence these can lead to inconsistencies and hanging MM contexts and PDP contexts in the network.

Problem 1

If something goes wrong in the SRNS Relocation procedure after step 6, but before step 14 in FIG. 1, e.g. because the MS looses its radio connection, both the source RNC (Radio Network Controller) and the old SGSN (Serving GPRS Support Node) monitor the procedure and have timers to detect that a fault has occurred. The idea is that the old SGSN should initiate a cleanup of such a fault. However, no procedures are defined for how the old SGSN should inform the new SGSN of the fault situation, and there is no mechanism described for how the new SGSN should detect such a fault. This means that there might be unreleased resources in the target RNC, in the new SGSN, and in the involved GGSN(s) (Gateway GPRS Support Node), as the new SGSN now should be responsible for the GTP tunnels towards the involved GGSN(s). The old SGSN can only clean up the resources in the source RNC, and if wanted, in the old SGSN. This is only a problem for an MS in a UMTS network.

Problem 2

This problem arises when an SRNS Relocation procedure is performed successfully for the MS up to and including step 13, but step 14 in FIG. 1 is not performed successfully, e.g. because the MS has lost its radio connection. As a result of this, both the old SGSN and the new SGSN have the data on the MS (i.e. its MM context and its PDP contexts), and the new SGSN has updated the involved GGSN(s) (Gateway GPRS Support Node), so that traffic can be sent between the new SGSN and the involved GGSN(s). The new SGSN will not yet have established the connection towards the MSC/VLR (Mobile Services Switching Centre/Visitor Location Register), and the new SGSN will not yet have updated the HLR (Home Location Register). This is all illustrated in FIG. 1.

If the MS looses its RRC (Radio Resource Control) connection before step 14 in FIG. 1 is performed, the MM state in the MS will become PMM-Idle.

When it is possible again, and if the MS was not switched off in the mean time, the MS will perform the RAU procedure. This procedure can, however, be performed towards yet another new SGSN, here SGSN 1, e.g. due to the MS moving even further.

The situation described in the previous paragraph can also occur, and will be more likely to occur if an MS roams into an area where each of the RAN (Radio Access Network) nodes is connected to more than one SGSN. Since the P-TMSI parameter will not be allocated from the new SGSN to the MS in the SRNS Relocation procedure, the RNC (Radio Network Controller) can route the RAU Request message to any SGSN within the SGSN pool, and it might be routed to SGSN 1, just like in the example described in the previous paragraph. (When having an SGSN pool, each of the SGSNs within this pool will have unique value ranges of the P-TMSI parameter, i.e. two SGSNs placed in the same SGSN pool will not have overlapping value ranges of the P-TMSI parameter. Since a new P-TMSI value is allocated to an MS when it connects to an SGSN, and since the part of the P-TMSI parameter that identifies from which SGSN it was allocated, is provided by the MS when it sends messages (at least the initial messages), the RAN node can normally route the messages sent from the MS to the correct SGSN. The problem described here is that a new SGSN within the SGSN pool is already allocated in the SRNS Relocation procedure, but the new SGSN has not yet allocated a new P-TMSI value to the MS when the MS sends its initial request message in the form of the RAU Request message.

Independent of why the RAU Request message is sent to SGSN 1 (two possible scenarios are described in the two previous paragraphs), SGSN 1 will perform the RAU procedure as described for an MS in state PMM-Idle in 3GPP TS 23.060. SGSN 1 will therefore receive the MS data from the old SGSN, since the old RA (Routing Area) points to the old SGSN. (If the old SGSN is placed in an SGSN pool, the part of the P-TMSI parameter that identifies the different SGSNs of this pool can also be used to contact the correct old SGSN.)

After the RAU procedure, SGSN 1 is not aware of any fault situation since it has received the MM context and the PDP context(s) of the MS. Also, SGSN 1 has updated the MSC/VLR (when required) and the HLR, as well as the involved GGSNs. Also the old SGSN is not aware of any fault situation since it has received the Cancel Location message from the HLR, and hence it has removed all data from this MS.

However, the new SGSN (new SGSN in the SRNS Relocation procedure) has a hanging MM context and PDP contexts for the MS. CDRs (Call Detail Records) for charging will also be generated for the MS in this SGSN.

The MM state of the MS in this new SGSN (new SGSN in the SRNS Relocation procedure) should go to MM state PMM-Idle relatively quickly. Since the new SGSN will not now receive any messages from the MS, i.e. it will not receive any Periodic RAU Request message from the MS, the new SGSN will change the MM state to PMM-Detached. This normally takes around one hour.

The normal action is then to send the message 'Purge MS' to the HLR (not necessarily at once, but at least when more resources are required) in order to inform the HLR that the MS data is removed from the SGSN. In this described traffic case, however, it should not be necessary to purge the MS since the HLR association is never created from the new SGSN.

If the 'Purge MS' message is sent to the HLR after all, the HLR should reject the purge and do nothing with the data stored for the MS. Therefore, this should not cause any further problems, except that the operation and maintenance system might be informed and/or the fault could be logged.

This is only a problem for an MS in a UMTS network.

Problem 3

Figure 3:
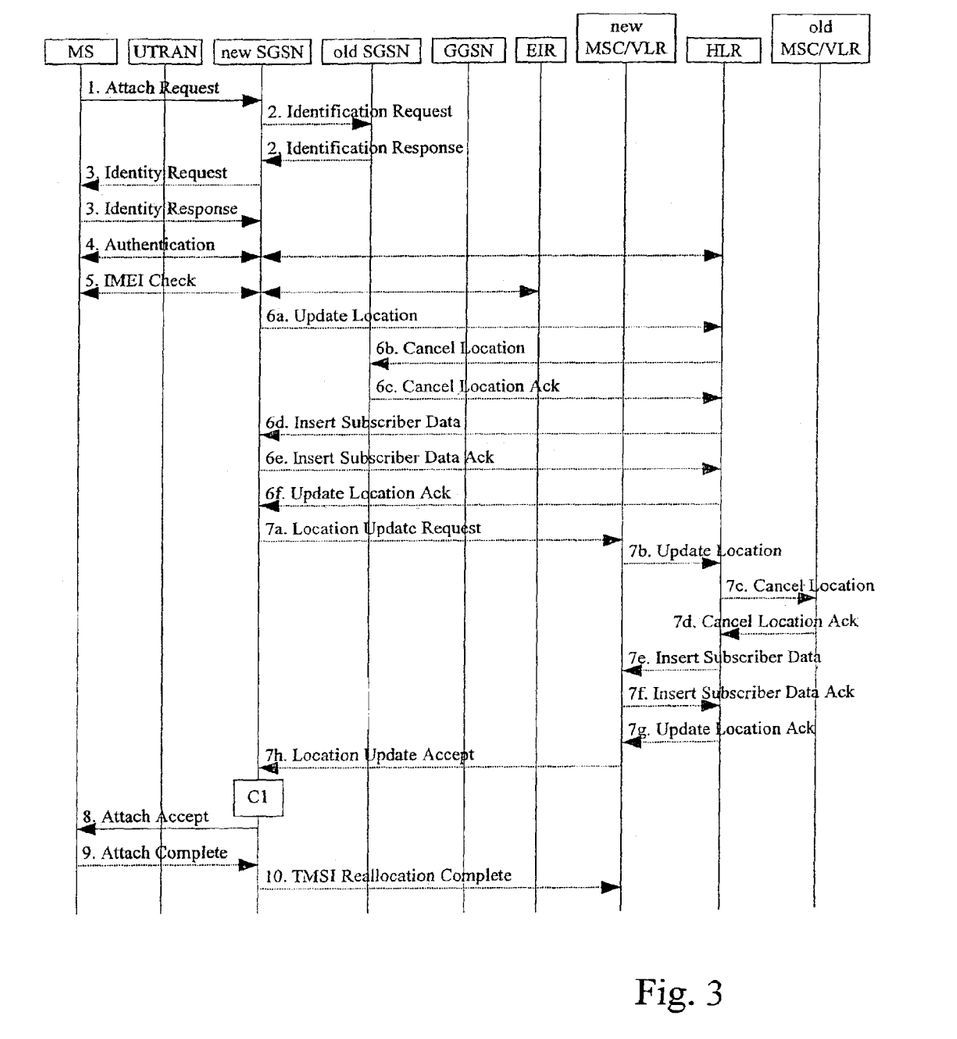
FIG. 3 illustrates a combined GPRS/IMSI Attached Procedure.

In order to describe this problem better, the Attach procedure, as described in 3GPP TS 23.060, is shown in FIG. 3.

1) For GPRS, the MS initiates the attach procedure by the transmission of an Attach Request (IMSI or P-TMSI and old RAI, Classmark, CKSN, Attach Type, DRX Parameters, old P-TMSI Signature) message to the SGSN. IMSI shall be included if the MS does not have a valid P-TMSI available. If the MS has a valid P-TMSI, then P-TMSI and the old RAI associated with P-TMSI shall be included. Classmark contains the MS's GPRS multi-slot capabilities and supported GPRS ciphering algorithms in addition to the existing classmark parameters defined in GSM 04.08. Attach Type indicates which type of attach is to be performed, i.e. GPRS attach only, GPRS Attach while already IMSI attached, or combined GPRS/IMSI attach. DRX Parameters indicates whether the MS uses discontinuous reception or not. If the MS uses discontinuous reception, then DRX Parameters also indicate when the MS is in a non-sleep mode able to receive paging requests and channel assignments. If the MS uses P-TMSI for identifying itself and if it has also stored its old P-TMSI Signature, then the MS shall include the old P-TMSI Signature in the Attach Request message.

2) For UMTS, the MS initiates the attach procedure by the transmission of an Attach Request (IMSI or P-TMSI and old RAI, Core Network Classmark, KSI, Attach Type, old P-TMSI Signature, Follow On Request, DRX Parameters) message to the SGSN. IMSI shall be included if the MS does not have a valid P-TMSI available. If the MS uses P-TMSI for identifying itself and if it has also stored its old P-TMSI Signature, then the MS shall include the old P-TMSI Signature in the Attach Request message. If the MS has a valid P-TMSI, then P-TMSI and the old RAI associated with P-TMSI shall be included. KSI shall be included if the MS has valid security parameters. Core Network Classmark is described in clause "MS Network Capability". The MS shall set "Follow On Request" if there is pending uplink traffic (signalling or user data). The SGSN may use, as an implementation option, the follow-on request indication to release or keep the Iu connection after the completion of the GPRS Attach procedure. Attach Type indicates which type of attach is to be performed, i.e. GPRS attach only, GPRS Attach while already IMSI attached, or combined GPRS/IMSI attach. DRX Parameters indicates whether or not the MS uses discontinuous reception and the DRX cycle length.

3) If the MS identifies itself with P-TMSI and the SGSN has changed since detach, the new SGSN sends an Identification Request (P-TMSI, old RAI, old P-TMSI Signature) to the old SGSN to request the IMSI. The old SGSN responds with Identification Response (IMSI, Authentication Triplets (for GPRS) or Authentication Vectors (for UMTS)). If the MS is not known in the old SGSN, the old SGSN responds with an appropriate error cause. The old SGSN also validates the old P-TMSI Signature and responds with an appropriate error cause if it does not match the value stored in the old SGSN.

4) If the MS is unknown in both the old and new SGSN, the SGSN sends an Identity Request (Identity Type=IMSI) to the MS. The MS responds with Identity Response (IMSI).

5) The authentication functions are defined in the clause "Security Function". If no MM context for the MS exists anywhere in the network, then authentication is mandatory. Ciphering procedures are described in clause "Security Function". If P-TMSI allocation is to be carried out and the network supports ciphering, the network shall set the ciphering mode.

6) The equipment checking functions are defined in the clause "Identity Check Procedures". Equipment checking is optional.

7) If the SGSN number has changed since the GPRS detach, or if it is the very first attach, then the SGSN informs the HLR:

a. The SGSN sends an Update Location (SGSN Number, SGSN Address, IMSI) to the HLR.

b. The HLR sends Cancel Location (IMSI, Cancellation Type) to the old SGSN with Cancellation Type set to Update Procedure.

c. The old SGSN acknowledges with Cancel Location Ack (IMSI). If there are any ongoing procedures for that MS, the old SGSN shall wait until these procedures are finished before removing the MM and PDP contexts.

d. The HLR sends Insert Subscriber Data (IMSI, GPRS Subscription Data) to the new SGSN.

e. The new SGSN validates the MS's presence in the (new) RA. If due to regional subscription restrictions the MS is not allowed to attach in the RA, the SGSN rejects the Attach Request with an appropriate cause, and may return an Insert Subscriber Data Ack (IMSI, SGSN Area Restricted) message to the HLR. If subscription checking fails for other reasons, the SGSN rejects the Attach Request with an appropriate cause and returns an Insert Subscriber Data Ack (IMSI, Cause) message to the HLR. If all checks are successful, then the SGSN constructs an MM context for the MS and returns an Insert Subscriber Data Ack (IMSI) message to the HLR.

f. The HLR acknowledges the Update Location message by sending an Update Location Ack to the SGSN after the cancelling of old MM context and insertion of new MM context are finished. If the Update Location is rejected by the HLR, the SGSN rejects the Attach Request from the MS with an appropriate cause.

8) If Attach Type in step 1 indicated GPRS Attach while already IMSI attached, or combined GPRS/IMSI attached, then the VLR shall be updated if the Gs interface is installed. The VLR number is derived from the RA information. The SGSN starts the location update procedure towards the new MSC/VLR upon receipt of the first Insert Subscriber Data message from the HLR in step 6d). This operation marks the MS as GPRS-attached in the VLR.

a. The SGSN sends a Location Update Request (new LAI, IMSI, SGSN Number, Location Update Type) message to the VLR. Location Update Type shall indicate IMSI attach if Attach Type indicated combined GPRS/IMSI attach. Otherwise, Location Update Type shall indicate normal location update. The VLR creates an association with the SGSN by storing SGSN Number.

b. If the LA update is inter-MSC, the new VLR sends Update Location (IMSI, new VLR) to the HLR.

c. If the LA update is inter-MSC, the HLR sends a Cancel Location (IMSI) to the old VLR.

d. The old VLR acknowledges with Cancel Location Ack (IMSI).

e. If the LA update is inter-MSC, the HLR sends Insert Subscriber Data (IMSI, GSM subscriber data) to the new VLR.

f. The VLR acknowledges with Insert Subscriber Data Ack (IMSI).

g. After finishing the inter-MSC location update procedures, the HLR responds with Update Location Ack (IMSI) to the new VLR.

h. The VLR responds with Location Update Accept (VLR TMSI) to the SGSN.

9) The SGSN selects Radio Priority SMS, and sends an Attach Accept (P-TMSI, VLR TMSI, P-TMSI Signature, Radio Priority SMS) message to the MS. P-TMSI is included if the SGSN allocates a new P-TMSI.

10) If P-TMSI or VLR TMSI was changed, the MS acknowledges the received TMSI(s) by returning an Attach Complete message to the SGSN.

11) If VLR TMSI was changed, the SGSN confirms the VLR TMSI re-allocation by sending a TMSI Reallocation Complete message to the VLR.

As can be seen from FIG. 3, if the MS connects to the network again with an Attach procedure, e.g. after having lost its radio connection or due to that the battery was removed and inserted again, when the MS activates one or more PDP context(s), the involved GGSN(s) for this MS will have hanging PDP context(s). The reason is that the path between the old SGSN and the involved GGSN(s) is never cleaned up. Again, this will lead to problems with charging and CDR generation. The resources in the RAN node might also be hanging for some time.

This is a problem for an MS in both a UMTS network and in a GSM (Global System for Mobile Communication) network.

For clarity, the three different problems discussed above will in the following be repeated in short:

Problem 1:
There can be unreleased resources in the target RNC, in the new SGSN (of the SRNS Relocation procedure), and in the involved GGSN(s).
CDRs will be generated in the new SGSN (by the SRNS Relocation procedure) and in the involved GGSN(s). This can cause billing of the subscriber when he/she does not have access to the resources he/she is paying for in the network.

Problem 2:
There can be unreleased resources in the target RNC, in the new SGSN (of the SRNS Relocation procedure), and possibly also in the involved GGSN(s). The new SGSN (of the SRNS Relocation procedure) does not know if the MS has performed an RAU procedure through another SGSN, and hence the new SGSN does not know if it is responsible for the GTP tunnels towards the involved GGSN(s).
CDRs will unnecessarily be generated in the new SGSN (of the SRNS Relocation procedure) and, unless the MS has performed a successful RAU procedure via another SGSN, also in the involved GGSN(s). This can cause billing of the subscriber when he/she does not have access to the resources he/she is paying for in the network.

Problem 3:
If the MS connects to the network again with an Attach procedure, e.g. after having lost its radio connection or due to that the battery was removed and inserted again, when the MS activates one or more PDP context(s), the involved GGSN(s) for this MS will have hanging PDP context(s). The RAN node used for this MS might also have unreleased resources, at least in a UMTS network.
CDRs will be generated unnecessary in the involved GGSN(s).

Thus, some of these errors can, if not resolved, lead to that the PDP contexts are hanging forever in the GGSNs, and for a substantial time in the SGSNs and the RNCs. As time passes, more and more resources will then be busy due to such hanging MM contexts and PDP contexts. This is of course crucial to avoid for an operator, since it might mean loss of revenue at peak periods, and that more nodes might be required in the network to serve the same number of subscribers, which again will increase the cost for the operators.

BRIEF DESCRIPTION OF THE SEVERAL VIEW OF THE DRAWINGS

In order to make the invention more readily understandable, the discussion that follows will refer to the accompanying drawings, in which.

DETAILED DESCRIPTION OF THE INVENTION

The present invention proposes some inventive improvements of the existing standard solving the problems described above. In the following, a solution of each of the three problems discussed above will be described.

When a fault situation (e.g. radio connection lost) occurs in an SRSN Relocation Procedure after step 6 in FIG. 1, the source SGSN will be informed or detect this, and according to the first aspect of the present invention, a procedure will then be initiated by sending a message towards the new SGSN. This procedure could e.g. be the already specified Relocation Cancel procedure (FIG. 2), or a version of it. If this is done, the new SGSN should then initiate release of the associated resources in the target RNC as well as release the associated resources locally in the new SGSN.

With respect to cleaning up the resources in the involved GGSNs, two embodiments are proposed.

In the first embodiment, which is simple and preferable, the new SGSN also initiates a release of the resources in the involved GGSN(s) by sending a Delete PDP Context Request towards each of the involved GGSN(s) (after first having updated each of them by sending Update PDP Context Request). If this is done, the old SGSN could also delete the PDP contexts for this MS and initiate release of the resources in the source RNC. For security reasons, it is required that the sending of the IMSI (International Mobile Subscriber Identity) parameter over the air interface is limited to a minimum. Thus, the old SGSN should preferably not delete the MM context for this MS, neither the IMSI, the P-TMSI, the P-TMSI Signature, nor the authentication data.

Figure 4:
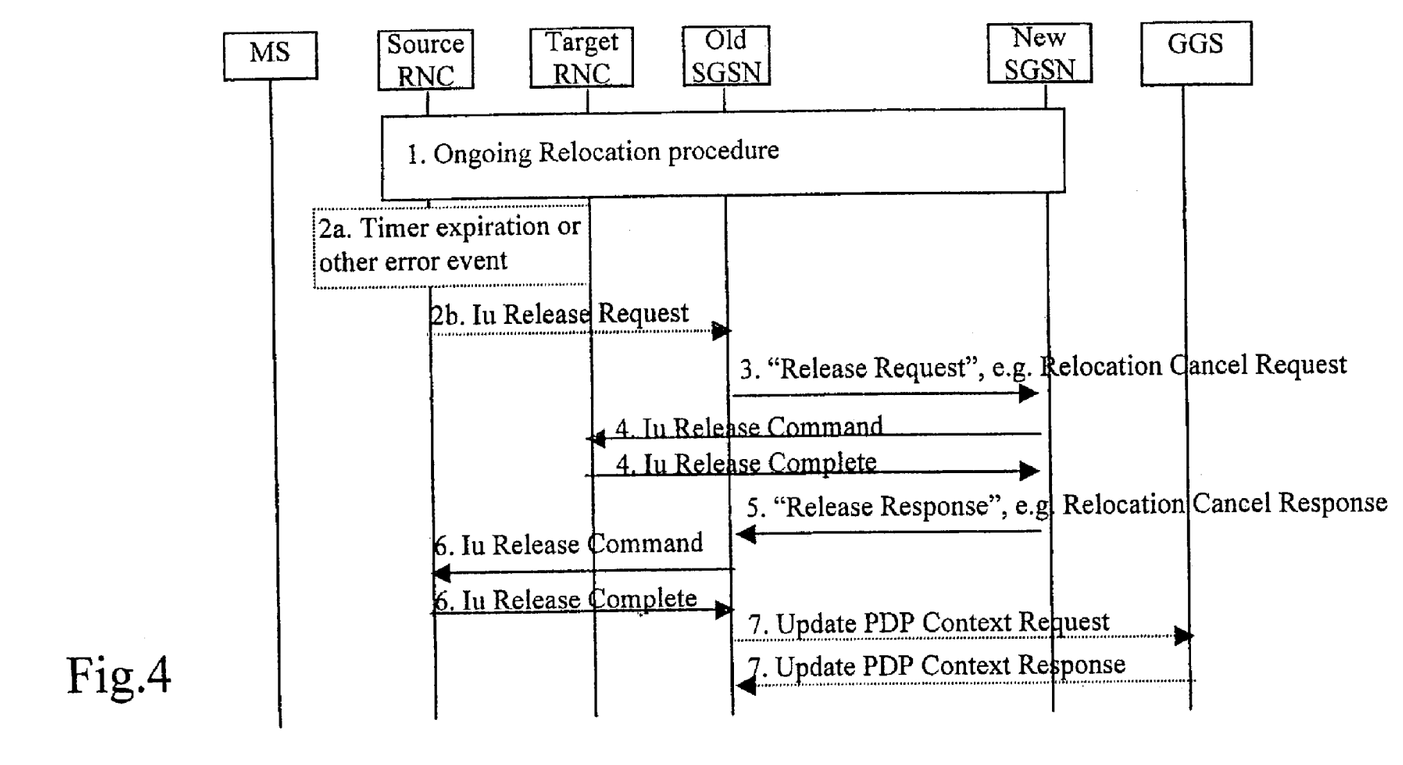
FIG. 4 illustrates an SRSN Cancel Relocation Procedure carried out when the preparation part of the SRSN Relocation is finished according to a first embodiment of the present invention.

In the second embodiment, the old SGSN should still have the GTP tunnels towards the involved GGSN(s) when the situation is cleaned up. This means that the old SGSN should update the involved GGSN(s) (see step 7 in FIG. 4), at least if the new SGSN has updated the involved GGSN(s) in the SRNS Relocation procedure. In this way, a path is again established between the old SGSN and each of the involved GGSN(s). Therefore, the new SGSN should preferably supply the old SGSN with the GTP (GPRS Tunnelling Protocol) end points for each of the involved GGSN(s). This should be done in step 5 in FIG. 4, or in a separate message sent before or after step 5. The old SGSN should also preferably initiate release of the resources in the source RNC, as shown in FIG. 4.

The message flow for the first aspect of the present invention will now be described in details referring to FIG. 4.

1) An SRNS Relocation procedure has started, as described in FIG. 1.
2) The Iu Release Request message may be sent to the old SGSN, and if sent, the sending of the message may be triggered by a timer expiry or by an error event in the source RNC. The cause code should here preferably be set to "T<sub>RELOC</sub>-overall".
3) The old SGSN detects that a fault occurred. This is either detected due to receiving the Iu Release Request message in step 2 or due to expiry of a timer in the old SGSN. Independent of how the fault is detected, the old SGSN sends a "Release Request" message, e.g. the Relocation Cancel Request message, to the new SGSN to indicate that the ongoing SRNS relocation should be cancelled.
4) The new SGSN sends an Iu Release Command to request the target RNC to release the Iu resources already allocated for the SRNS relocation, or to cancel the ongoing allocation of Iu resources for the SRNS relocation. The target RNC releases the requested Iu resources and responds with an Iu Release Complete.
5) The new SGSN releases locally the resources used for this MS.
6) For option 1, the new SGSN also sends Delete PDP Context Request message(s) to the involved GGSN(s), after having sent Update PDP Context Request message(s) to the involved GGSN(s) and received Update PDP Context Response message(s). The involved GGSN(s) will respond with Delete PDP Context Response message(s).
7) The new SGSN acknowledges the cancellation of the ongoing SRNS Relocation by sending a "Release Response" message, e.g. a Relocation Cancel Response message, to the old SGSN.
8) The new SGSN could include an indication of whether the new SGSN had updated the involved GGSN(s) or not, or if it has sent Delete PDP Context Request to any or all of the involved GGSN(s). This could be indicated per PDP context. If the new SGSN has updated the involved GGSN(s) without ordering a delete of the PDP contexts in the involved GGSN(s), it should preferably include the GTP tunnel end points of the involved GGSNs in the response message to the old SGSN. This might either be supplied in the "Release Response" message or in a separate message.
9) The old SGSN should order release of the resources in the source RNC with an Iu Release Command message. The source RNC does so and returns an Iu Release Complete message. This step could be performed before step 3 or just after step 3.
10) For option 2, the old SGSN updates the GTP tunnels towards the involved GGSN(s) by sending the Update PDP Context Request message to each of the involved GGSNs, if these paths were updated by the new SGSN.
11) The order of step 6 and step 7 is independent of each other, and can be shifted around, unless step 6 is performed either before step 3 or just after step 3.

If the resources in the involved GGSN(s) are deleted, i.e. according to the second embodiment of the above solution, then problem 1 can also be solved with the same solution as suggested for problem 2.

The second aspect of the present invention addresses problem 2 when a fault occurs in step 14 of FIG. 1. According to a preferred embodiment of this aspect, enabling the new SGSN to clean up its own resources in this case, the new SGSN should time supervise the complete SRNS Relocation and the RAU procedure. This time supervision in the new SGSN should preferably be started when it receives the Forward Relocation Request message shown in FIG. 1, and it should preferably be stopped when the RAU procedure has been completed, or when the new SGSN has received the RAU Request message.

If the RAU Request message is received and the RAU procedure is successfully performed in the new SGSN, the handling is performed as already described in 3GPP TS 23.060.

If the RAU Request message is not received within a monitored time, or the RAU procedure is not successfully performed (within a monitored time), the new SGSN should initiate release of the resources in the target RNC, send Delete Request messages to all involved GGSN(s) and initiate a local detach, i.e. remove locally all data on the MS. Also, the CDRs should be marked as abnormally terminated, or they should be removed completely.

The GGSNs should check the source of the Delete Request messages before deleting the contexts. If the message is sent from the correct source, i.e. from the last SGSN to which the PDP context was established, the GGSN should delete the PDP context. If the source of the message is incorrect, the GGSN should not delete the PDP context. The GGSN should check the source of the Delete Request messages since the MS might have performed a successful RAU procedure through another SGSN than the one being the new SGSN in the SRNS Relocation procedure. But, independent of whether or not the PDP context is deleted in the GGSN, the GGSN should respond with a Delete Response message to the SGSN that sent the Delete Request message (possibly with a cause code informing of the situation).

The new SGSN should not send the message 'Purge MS' to the HLR if the association to the HLR is not created for this MS. A flag or a state of the association between the SGSN and the HLR could be utilized in the SGSN to indicate whether or not the SGSN should send the message 'Purge MS' to the HLR when deleting the data on the MS in the SGSN.

Figure 5:
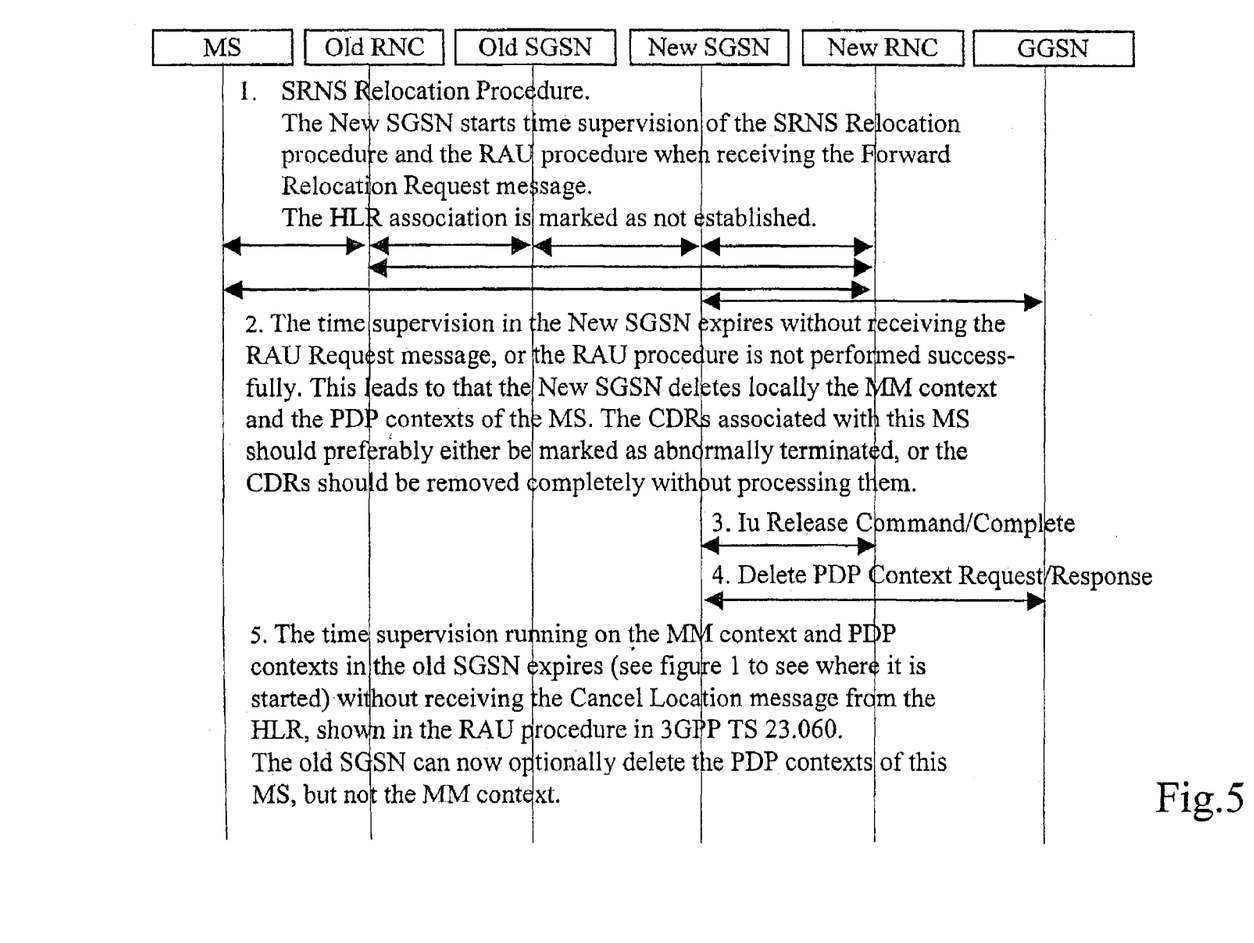
FIG. 5 illustrates an SRNS Relocation Procedure followed by an RAU Procedure in a fault situation solved by a third embodiment of the present invention.

The message flow for the preferred embodiment of the second aspect of the present invention will now be described in details referring to FIG. 5.

1) An SRNS Relocation procedure as described in 3GPP TS 23.060 is performed, except for the RAU procedure, which is not performed. The New SGSN starts a time supervision on the completion of the SRNS Relocation procedure followed by an RAU procedure upon receiving the Forward Relocation Request message. The HLR association is also marked as not established in the New SGSN. (The HLR association will be marked as established in the New SGSN if the New SGSN updates the HLR with the location of the MS in the Attach procedure or in the RAU procedure.)

2) The time supervision that was started in step 1 in the new SGSN elapses since the RAU procedure was never completed, or the RAU Request message was not received. This leads to that the New SGSN deletes locally the MM context and the PDP contexts of the MS. The CDRs associated with this MS should either be marked as abnormally terminated, or the CDRs should be removed completely without processing them any further. The HLR is not purged for this MS since the HLR association is marked as not established. (The actions performed by the new SGSN can alternatively be made in step 3 or in step 4.)

3) The new SGSN sends an Iu Release Command message to request from the target RNC to release the Iu resources already allocated for the SRNS Relocation procedure. The target RNC releases the requested Iu resources and responds with an Iu Release Complete message.

4) The New SGSN sends Delete PDP Context Request messages towards all involved GGSN(s) for this MS. The GGSN will only delete the PDP context(s) (and MM context if such are also created in the GGSN(s) for the MS if the Delete PDP Context Request message is received from the correct SGSN, i.e. the SGSN to which the GGSN established the PDP context. The GGSN will return a Delete PDP Context Response message independent of whether or not the PDP context was deleted in the GGSN.

5) The time supervision running on the MM context and PDP contexts in the old SGSN expires (see FIG. 1 to see where it is started) without receiving the Cancel Location message from the HLR, shown in the RAU procedure in 3GPP TS 23.060. The old SGSN could now optionally delete the PDP contexts of this MS, but not the MM context, or at least not the IMSI, the P-TMSI, the P-TMSI signature and the authentication data.

A second embodiment of the second aspect of the present invention is as follows. In FIG. 1, the new SGSN can wait with sending the Forward Relocation Complete message to the old SGSN (shown in step 12) until the new SGSN has received the RAU Request message from the MS. In case the RAU Request message is not received, a timer will expire either in the source RNC or in the old SGSN, and the problem will be solved as for problem 1. The advantage of this alternative solution is that the new SGSN does not have to monitor for the RAU Request message. The drawback is that it is not preferred to mix the two procedures and since the complete RAU procedure is not time supervised, problems can still occur, although the risk is smaller. For this reason, the first embodiment of the second aspect (shown in FIG. 5) is preferred.

Now turning to the third aspect of the present invention addressing the third problem mentioned previously.

As already discussed, if the MS connects to the network again with an Attach procedure (e.g. after losing its radio connection or due to the battery being removed and inserted again), when the MS activates one or more PDP context(s), also the involved GGSN(s) and the RNC for this MS will have unreleased resources for these PDP context(s).

Figure 6:
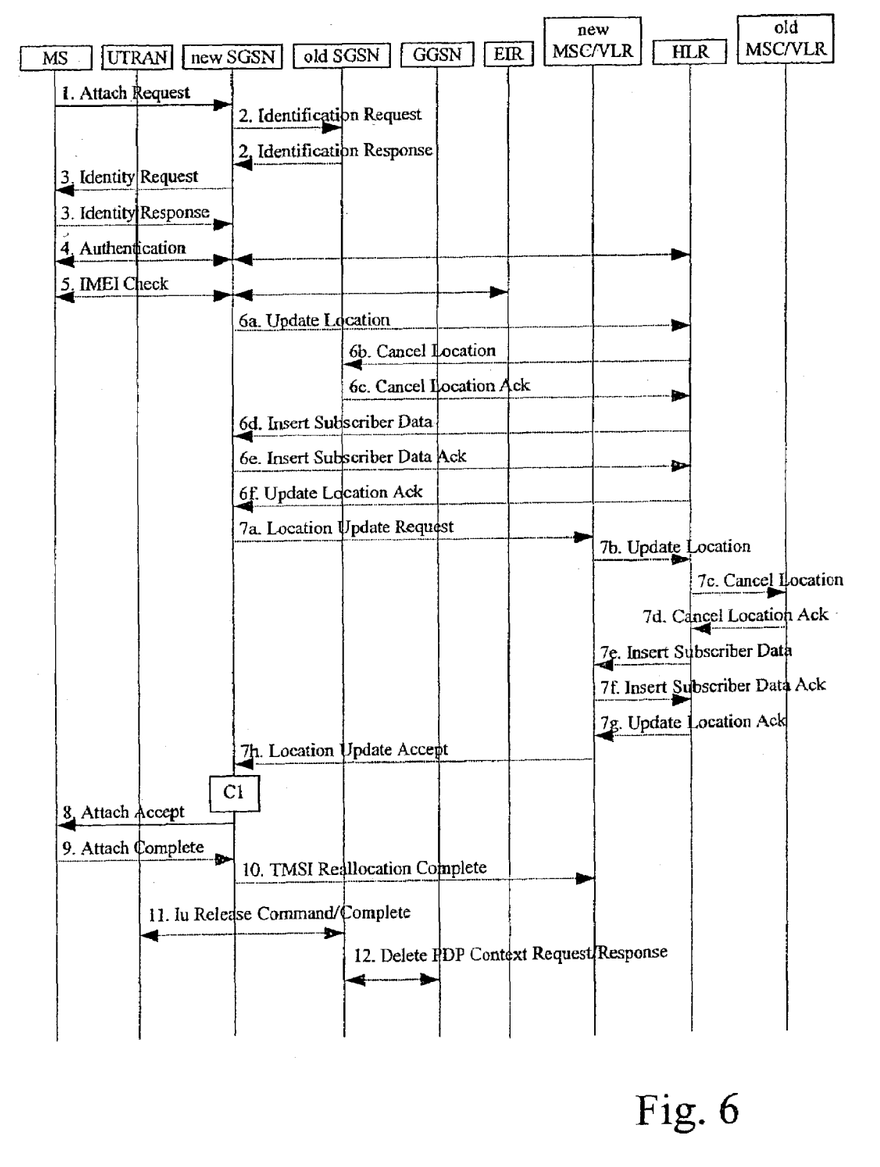
FIG. 6 illustrates an improved attached procedure according to the present invention.

According to the third aspect of the present invention, the solution to this problem is that the old SGSN takes some actions, preferably upon receiving the Cancel Location message shown in step 6b of FIG. 6, or just after sending the response to the HLR, shown in step 6c. It could, however, instead be done in correspondence with step 2 of FIG. 6.

If the Attach Request message is received in the same SGSN to which the MS previously was connected, this SGSN takes the actions.

The actions consist in the (old) SGSN initiating release of any unreleased resources in the source RNC by sending the Iu Release Command message, and it should send Delete PDP Context Request messages to the involved GGSN(s), if the (old) SGSN is still responsible for existing GTP tunnels towards these GGSN(s). The (old) SGSN should also delete the local resources and data for the PDP contexts for this MS.

This third aspect of the present invention is illustrated in FIG. 6. Steps 1-10 are already described in connection with FIG. 3, and since they are exactly the same for FIG. 6, the description of these steps are not repeated here. Only steps 11 and 12 are new. Note that although steps 11 and 12 in FIG. 6 are shown in the end of the sequence (for simplicity), they can be carried out anytime after step 2 when the old SGSN receives the Identification Request message. Preferably steps 11 and 12 should be performed by the old SGSN just after receiving the Cancel Location message shown in step 6b, or just after sending the response to the HLR in step 6c. Although not shown in an explicit step, the SGSN shall also delete all internal data, and preferably after having performed both steps 11 and 12. Also, step 12 can be carried out before step 11, and step 11 is only performed when the SGSN is connected to a RAN node in Iu mode.

1) The old SGSN sends an Iu Release Command message to the old RAN node if there is a signalling connection towards the RAN node and Iu mode is used. If the RAN node receives an Iu Release Command message, the RAN node releases the resources used for the signalling connection and for any other connection that is set up for this MS, and deletes all associated data. Then the RAN node responds with an Iu Release Complete message.

2) The old SGSN sends a Delete PDP Context Request message to each of the involved GGSN(s) if the old SGSN is still responsible for the GTP tunnels towards the involved GGSN(s). The GGSN(s) will then release all used resources for this MS and delete all associated data, before returning the Delete PDP Context Response message. The old SGSN should then delete the local resources and data for the PDP contexts for this MS.

The various aspects of the present invention avoid faulty charging and hanging resources associated with the MSs in SGSNs, GGSNs and RNCs when a GPRS MS roams in a GSM or UMTS network. This means that the operators can better utilise the resources in the network nodes for the MSs, since the resources will only be occupied due to MSs having access to the network. This will lead to decreased cost for the operators. Also, the subscribers will not be charged for resources to which they have no access.

What is claimed:

1. A method for preventing the occurrence of a hanging resource in connection with a Serving Radio Network Subsystem (SRNS) Relocation Procedure when a mobile terminal roams from a first Serving General Packet Radio Service (GPRS) Support Node (SGSN) with an associated source Radio Network Controller (RNC) to a second SGSN with an associated target RNC, said method comprising the steps of:
   if, during said SRNS Relocation Procedure, said first SGSN detects that the connection to the mobile terminal is broken subsequent to transmission of a Relocation Command to said source SGSN, initiating a release of a resource established during the SRNS Relocation Procedure in the second SGSN, the target RNC or any involved Gateway GPRS Support Node (GGSN).

2. The method according to claim 1, further comprising the step of transmitting a GPRS Tunnelling Protocol (GTP) end point identity for each said involved GGSN from the second SGSN to the first SGSN, whereby said first SGSN maintains GTP tunnels towards each said involved GGSN.

3. The method according to claim 1, further comprising the step of said second SGSN indicating to said first SGSN i) which Packet Data Protocol (PDP) Contexts said second SGSN has sent Delete PDP Context Request messages to any involved GGSN, ii) which PDP Contexts have not been updated in any involved GGSN, or iii) which PDP Contexts have been updated but not deleted in any involved GGSN.

4. The method according to claim 1, wherein said resource is a Packet Data Protocol (PDP) Context, a Call Data Record (CDR) or a Mobility Management (MM) Context associated with said mobile terminal, and wherein said step of initiating said release comprises the steps of:
   transmitting a Relocation Cancel Request from said first SGSN to said second SGSN; and
   transmitting a Delete PDP Context Request from said second SGSN to each said involved GGSN.

5. The method according to claim 1, wherein said resource does not include the International Mobile Subscriber Identity (IMSI), the Packet Temporary Mobile Subscriber Identity (P-TMSI) or the P-TMSI Signature and the authentication data for the mobile terminal.

6. A method for preventing the occurrence of a hanging resource in connection with a Serving Radio Network Subsystem (SRNS) Relocation Procedure when a mobile terminal roams from a first Serving General Packet Radio Service (GPRS) Support Node (SGSN) with an associated source Radio Network Controller (RNC) to a second SGSN with an associated target RNC, said method comprising the steps of:
   a.) starting a timer in said second SGSN upon receiving a Forward Relocation Request from said first SGSN;
   b.) stopping said timer when a Routing Area Update (RAU) Procedure is completed or upon receiving an RAU Request from said mobile terminal; and
   c.) if said timer exceeds a predefined time period, initiating a release of a resource established during the SRNS Relocation Procedure in the second SGSN, the target RNC or any involved Gateway GPRS Support Node (GGSN).

7. The method according to claim 6, wherein said resource is a Packet Data Protocol (PDP) Context, a Call Data Record (CDR) or a Mobility Management (MM) Context associated with said mobile terminal, and wherein said step of initiating said release comprises the steps of:
   deleting the PDP Context, the CDR or the MM Context in said second SGSN; and
   transmitting a Delete PDP Context Request from said second SGSN to each said involved GGSN.

8. The method according to claim 7, further comprising, prior to step c.), performing the steps of:
   checking from which SGSN the Delete PDP Context Request is transmitted; and
   if said Delete PDP Context Request is not transmitted from said second SGSN, said release is not executed in any involved GGSN.

9. A method for preventing the occurrence of a hanging resource in connection with a Serving Radio Network Subsystem (SRNS) Relocation Procedure when a mobile terminal roams from a first Serving General Packet Radio Service (GPRS) Support Node (SGSN) with an associated source Radio Network Controller (RNC) to a second SGSN with an associated target RNC, said method comprising the step of:
   postponing transmission of a Forward Relocation Complete message from said second SGSN to said first SGSN until said second SGSN receives a Routing Area Update Request from said mobile terminal.

10. A method for preventing the occurrence of a hanging resource in connection with an uncontrolled broken connection between a mobile terminal and an associated Serving General Packet Radio Service (GPRS) Support Node (SGSN), Radio Network Controller (RNC) and Gateway GPRS Support Node (GGSN), comprising the step of:
   initiating, when said mobile terminal performs an Attach Procedure towards the network after the occurrence of said broken connection, a release of any resource established for said mobile terminal in said SGSN, RNC and GGSN prior to the occurrence of said broken connection.

11. The method according to claim 10, wherein said release is initiated by the SGSN either upon receiving a Cancel Location message during the Attach Procedure or just after returning a Cancel Location response to that message.

12. The method according to claim 10, wherein said resource is a Packet Data Protocol (PDP) Context, a Call Data Record (CDR) or a Mobility Management (MM) Context associated with said mobile terminal, and wherein said step of initiating said release comprises the steps of:
   deleting the PDP Context, the CDR or the MM Context in said second SGSN;
   transmitting a Delete PDP Context Request from said second SGSN to each said involved GGSN; and
   transmitting an Iu Release Command to said RNC.

* * * * *